United States Patent [19]
Hori et al.

[11] Patent Number: 5,568,566
[45] Date of Patent: Oct. 22, 1996

[54] DRAWING PROCESSING APPARATUS

[75] Inventors: Osamu Hori, Yokohama; Shigeyoshi Shimotsuji, Tokyo; Mieko Asano, Kawasaki, all of Japan

[73] Assignee: Kabushiki Kaisha Toshiba, Kawasaki, Japan

[21] Appl. No.: 173,932

[22] Filed: Dec. 28, 1993

Related U.S. Application Data

[63] Continuation of Ser. No. 797,354, Nov. 25, 1991, abandoned.

[51] Int. Cl.$^6$ ..................................................... G06K 9/48
[52] U.S. Cl. ........................... 382/197; 382/113; 382/282
[58] Field of Search ........................................ 382/9, 61, 21, 382/30, 33, 197, 195, 196, 199, 203, 173, 176, 113, 282, 294; 358/464; 395/135

[56] References Cited

U.S. PATENT DOCUMENTS

| | | | |
|---|---|---|---|
| 3,942,169 | 3/1976 | Fujimoto et al. | 382/21 |
| 4,718,103 | 1/1988 | Shojima et al. | 382/21 |
| 4,748,678 | 5/1988 | Takeda et al. | 382/61 |
| 4,817,172 | 3/1989 | Cho | 382/21 |
| 5,007,098 | 4/1991 | Kumagai | 382/21 |
| 5,140,650 | 8/1992 | Casey et al. | 382/9 |

OTHER PUBLICATIONS

"Computer Vision", Chapter 3, 3.2.3 Background Subtraction pp. 72–73; Dana H. Ballard, Christopher M. Brown; 1982.

"Digital Picture Processing", Chapter 9, 9.2 Registration pp. 23–31; Azriel Rosenfeld, Avinash C. Kak; 1982.

*Primary Examiner*—Yon J. Couso
*Attorney, Agent, or Firm*—Oblon, Spivak, McClelland, Maier, & Neustadt, P.C.

[57] ABSTRACT

A drawing processing apparatus for extracting figures from a drawing as numerical data, comprises a drawing input section for inputting a background drawing and a to-be-processed drawing having a figure on the background drawing, and outputting the drawings as image data, an image storing section for storing the image data corresponding to the background drawing and the to-be-processed drawing input by the drawing input section, a registration section for registering the background drawing and the to-be-processed drawing with each other using the image data read out from the image storing section, a vector forming section for dividing figures on the registered background drawing and to-be-processed drawing into a plurality of segments, and converting the segments into segment data of numerical values, thereby representing the segments as vectors, and a selecting section for selecting vectors, which correspond to the vectors formed from the figure on the background drawing, from among the vectors formed from the figure on the to-be-processed drawing.

6 Claims, 4 Drawing Sheets

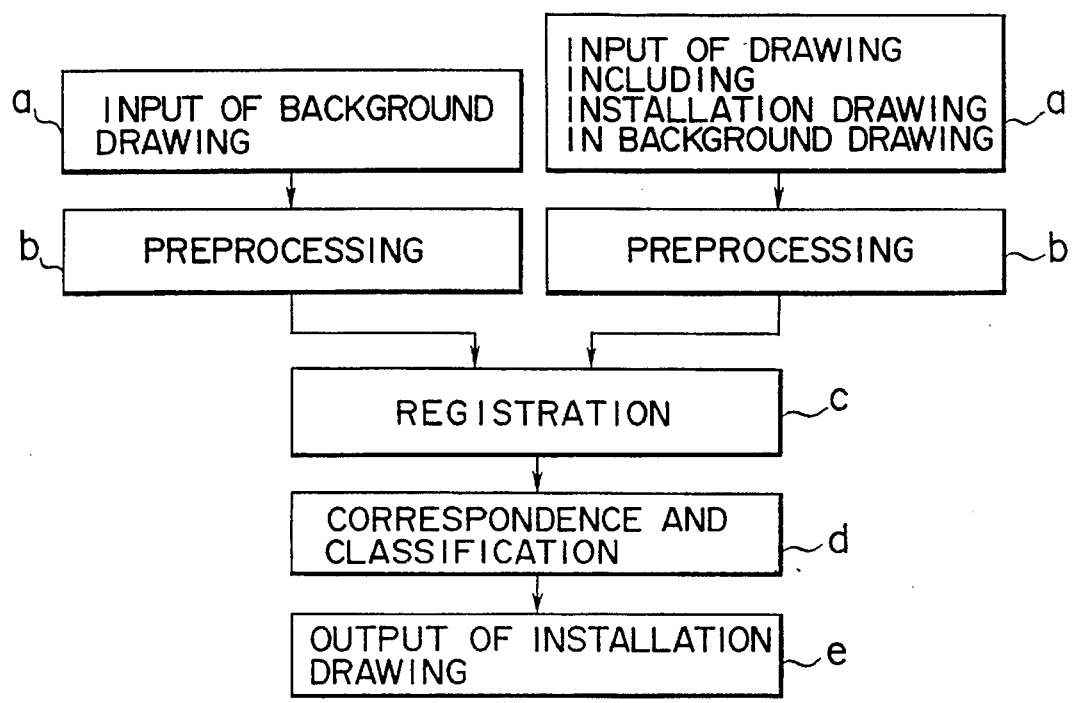
F I G. 1
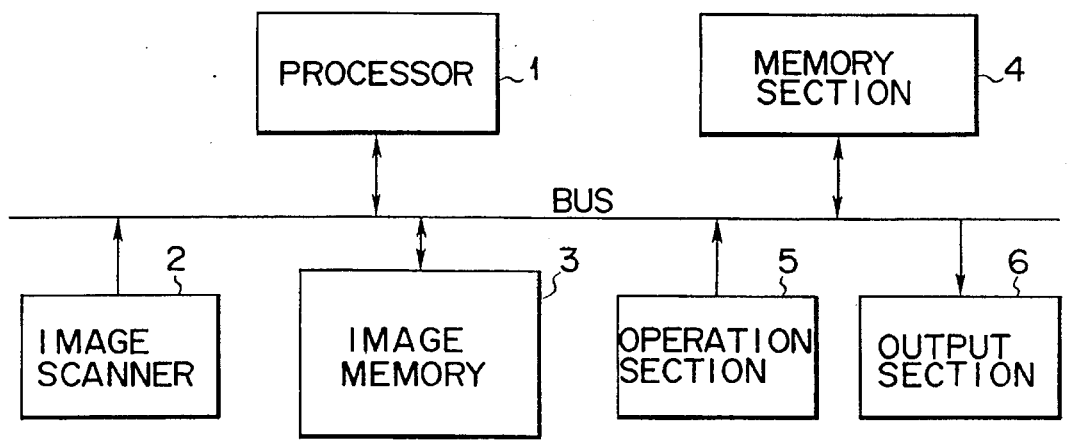
F I G. 2

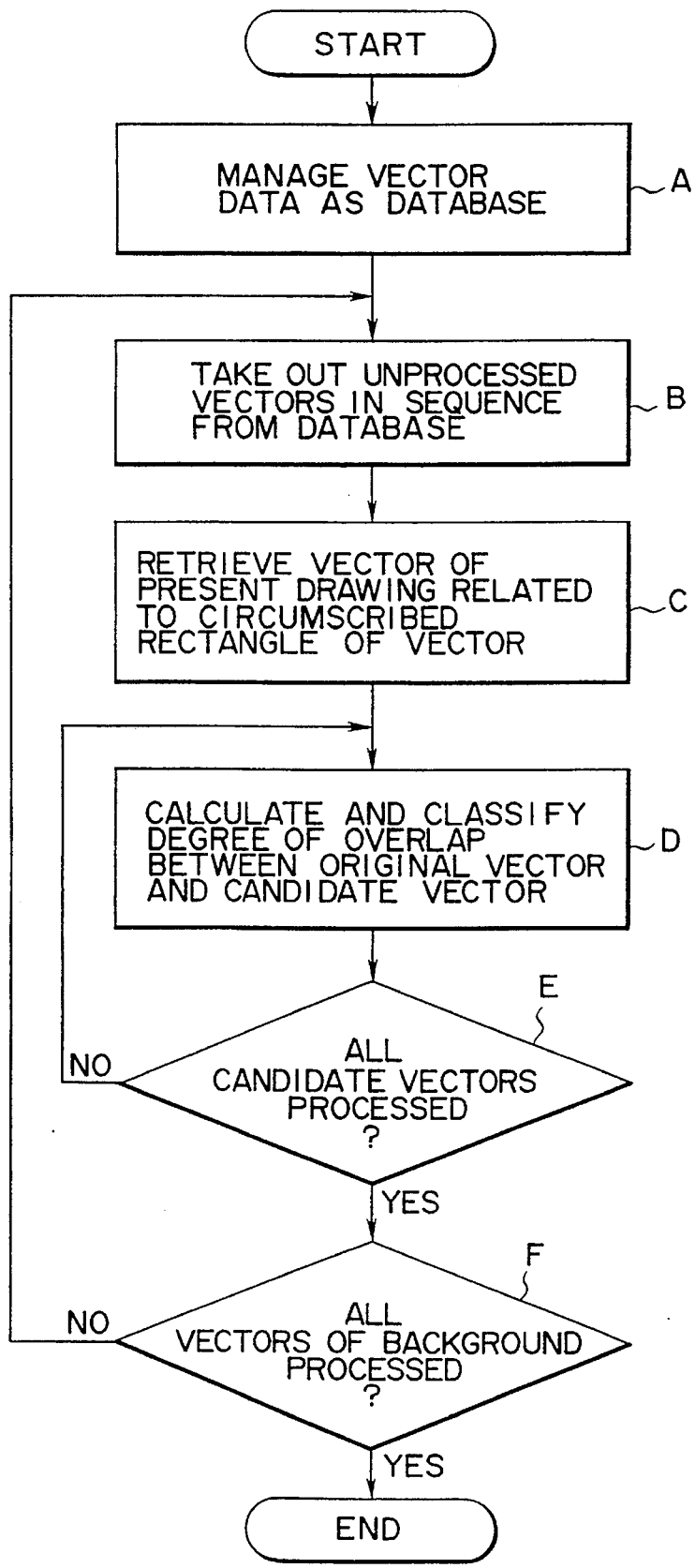
F I G. 4

DRAWING PROCESSING APPARATUS

This application is a continuation of application Ser. No. 07/797,354, filed on Nov. 25, 1991, now abandoned.

BACKGROUND OF THE INVENTION

1. Field of the Invention

The present invention relates to a drawing processing apparatus capable of effectively extracting figure data serving as input data from image data in a CAD/CAM system and a geographic information management system.

2. Description of the Related Art

As a result of the growing popularity of CAD/CAM systems, there has recently been a great demand that figure information be able to be automatically read out from a drawing. One way of meeting this demand has been the development of various types of drawing input apparatuses which automatically extract piping network information as a numerical data from an arrangement plan, using a pattern recognition technique or to read various lines such as dimension lines in a mechanical drawing.

However, a number of drawings such as arrangement plans, include information which is superimposed on maps. In this case, to input drawing information (figure information) of the drawings to a CAD/CAM system and extract only desired information, map information and arrangement plan information have to be separated from each other. However, a drawing made up of a combination of map information and arrangement plan information usually includes various segments and thus tends to be very complicated. As a result, it is often very difficult for drawing input apparatuses to correctly extract the segments by pattern recognition, and to extract desired segment data as numerical data. In addition, there is the drawback that, in such circumstances, the processing speed and recognition performance of the drawing processing apparatus are greatly reduced.

As described above, the conventional drawing input apparatus has the drawbacks wherein the map information of the background of the drawing and the arrangement plan information written on the map are difficult to separate from each other and the performance of pattern recognition of the arrangement plan is therefore reduced in pattern recognition.

The above related art is reported in Dana H. Ballard and Christopher M. Brown, "COMPUTER VISION," Chapter 3, 3.2.3 Background Subtraction, 1982, pp. 72–73, and Azriel Rosenfeld, Avinash C. Kak, "DIGITAL PICTURE PROCESSING," Chapter 9, 9.2 REGISTRATION, 1982, pp. 23–31.

SUMMARY OF THE INVENTION

An object of the present invention is to provide a drawing processing apparatus in which a figure in a drawing can effectively be extracted as numerical data by separating a figure element from the drawing before pattern recognition of the drawing.

A drawing processing apparatus which extracts figures from a drawing as numerical data according to the present invention is characterized by comprising:

drawing input means for inputting a background drawing and a to-be-processed drawing having a figure on the background drawing, and outputting the drawings as image data;

image storing means for storing the image data corresponding to the background drawing and the to-be-processed drawing input by the drawing input means;

registration means for registering the background drawing and the to-be-processed drawing with each other using the image data read out from the image storing means;

vector forming means for dividing figures on the registered background drawing and to-be-processed drawing into a plurality of segments, and converting the segments into segment data of numerical values, thereby representing the segments as vectors; and selecting means for selecting vectors, which correspond to the vectors formed from the figure on the background drawing, from the vectors formed from the figure on the to-be-processed drawing.

According to the drawing processing apparatus of the present invention, a figure in a background drawing based on which a to-be-processed drawing is prepared, can be selected and eliminated in advance from the to-be-processed drawing. If, therefore, segments in the to-be-processed drawing are arranged, a figure in the to-be-processed drawing can effectively be recognized and expressed as numerical data. As a result, the to-be-processed drawing recognizing performance is enhanced, and the to-be-processed drawing processing speed is increased.

As described above, according to the drawing processing apparatus of the present invention, the figure in the background drawing is separated and eliminated from the to-be-processed drawing, and a new figure is selectively extracted from the to-be-processed drawing. Therefore, the recognition processing of figure data can thus be performed by eliminating undesirable figure information and, in other words, the figure data can be converted into numerical data, resulting in great advantages in which the drawing processing time can be shortened and the recognition rate of the figure data can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic view showing steps of drawing processing of a drawing processing apparatus according to an embodiment of the present invention;

FIG. 2 is a block diagram schematically showing a structure of the apparatus shown in FIG. 1;

FIG. 4 is a flowchart showing correspondence processing of vectors;

DETAILED DESCRIPTION OF THE PREFERRED EMBODIMENTS

Figure 3:
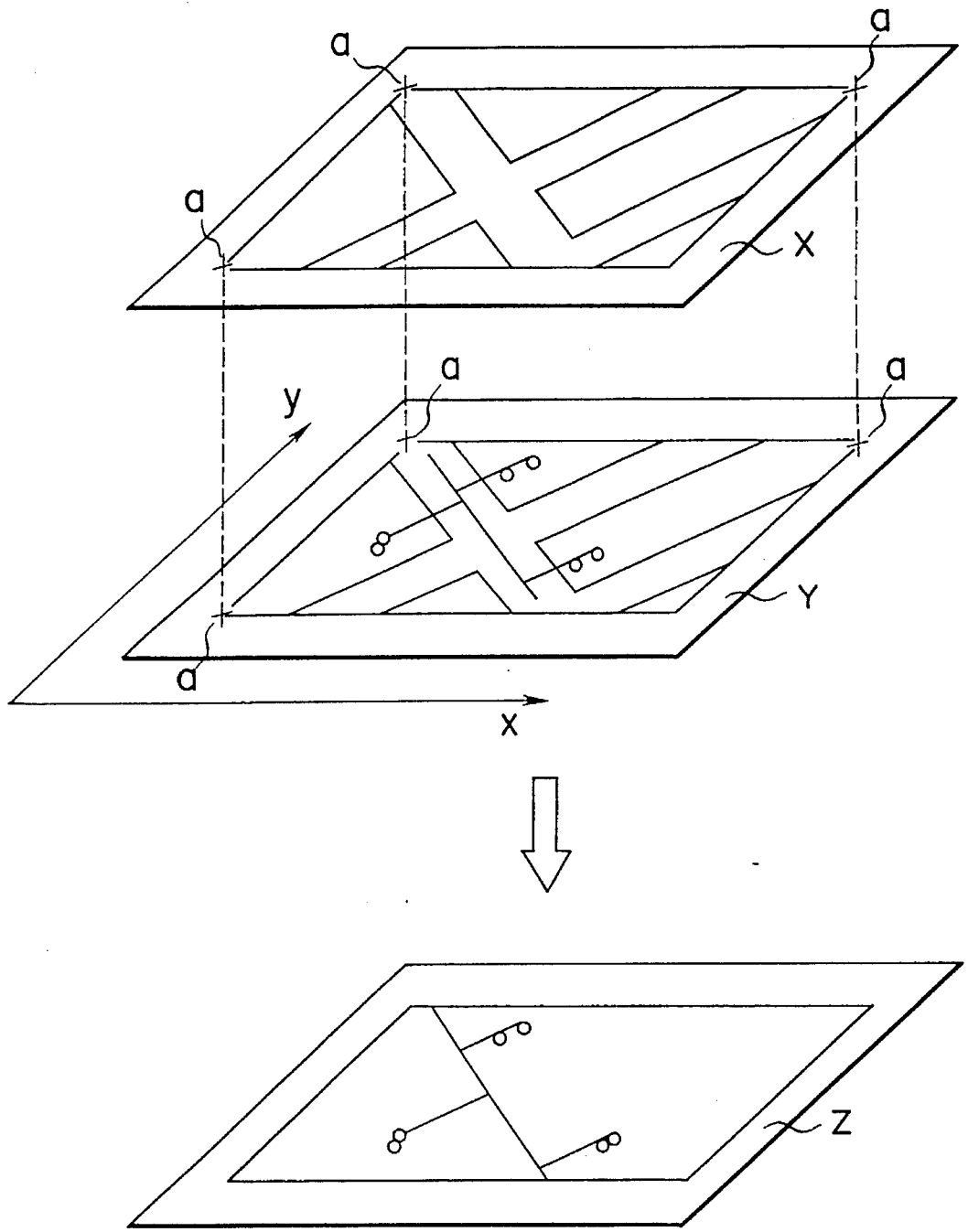
FIG. 3 is a schematic view showing a concept of the drawing processing of the apparatus shown in FIG. 1.

A drawing processing apparatus according to an embodiment of the present invention will be described with reference to the accompanying drawings.

FIG. 1 is a schematic view showing steps of drawing processing of the drawing processing apparatus.

Image data of a background drawing (map) for use in preparing a to-be-processed drawing and that of the to-be-processed drawing are input (step a). The to-be-processed drawing is prepared by superimposing a figure such as arrangement plan information on the background drawing (step a).

From then on, to easily make a figure element of the background drawing and that of the to-be-processed drawing correspond with each other, predetermined preprocessing such as thin line processing is performed (step b), and the two drawings are matched with each other according to positional information of characteristic points predetermined in the drawings (step c).

Segments of the drawings are represented by vectors, and the vectors are made correspondent between the drawings, or pixels constituting the figure element of the to-be-processed drawing, which correspond to those constituting that of the background drawing, are converted into data other than figure data, and the figure elements of the to-be-processed drawing and background drawing are made correspondent and then selected (step d). Only the figure element existing in the to-be-processed drawing is output as the installation information described in the background drawing (step e).

With the above steps of the drawing processing, a desired figure such as an arrangement plan in the to-be-processed drawing is effectively extracted to recognize the to-be-processed drawing with high precision to convert it into numerical data, and then to output as the numerical data.

FIG. 2 is a block diagram schematically showing a structure of the drawing processing apparatus shown in FIG. 1.

As shown in FIG. 2, a processor 1 for controlling the overall apparatus and performing its operation is connected to a scanner 2 for receiving a drawing as image data through a bus, image memory 3 for storing the received image data, a memory section 4 used to store various types of processing data and used as an image data processing work area, an operating section 5 such as a keyboard, and an output section 6 such as a display.

When a to-be-processed image or a background image is previously converted into binary image data or line image data, the image data is fetched through a predetermined interface.

An operation of the drawing processing apparatus constructed as shown in FIG. 2 will be described specifically.

The most basic processing is executed as follows. The figure elements of a background drawing and a to-be-processed drawing which are input as image data, are made correspondent to each other at a level of the image data. The pixel of the figure element of the to-be-processed drawing, which corresponds to that of the figure element of the background drawing, is converted into data other than figure data. The drawing element of the to-be-processed drawing is then converted into numerical data.

First, the background drawing and to-be-processed drawing are optically read out by the scanner 2, and they are converted into binary data and then stored in the image memory 3 as image data. The binary image data is acquired by setting the pixels of the drawing element of an input image at "1" and setting the other pixels at "0."

Next, the background and to-be-processed drawings, which are input as binary image data, are then registered with each other, as described above. The registration operation is performed as follows. As shown in FIG. 3, for example, three reference points a, which are put in advance on the background drawing X and to-be-processed drawing Y, are detected from the image data. The two images of drawings X and Y are then affine-transformed based on the positions of the detected three reference points. The positioning operation thus allows the two drawings to overlap each other based on the reference points of the same coordinate system.

Synchronizing an image x of the background drawing X stored in the image memory 3 and an image y of the to-be-processed drawing Y, the pixel of the same coordinates are scanned and, if the pixel of the image x of the background drawing is "1," the pixel of the same coordinate of an image y of the to-be-processed drawing Y is converted into "0."

In other words, the pixels of the to-be-processed drawing corresponding to the pixels representative of the figure of the background drawing are sequentially converted into data other than the figure and, in this case, the data is "0."

After the above operation, a concatenated element of the figure (pixel "1") in the to-be-processed drawing is measured, and a small isolated figure, which is considered to be noise, is deleted from the image y of the to-be-processed drawing. The deletion of the isolated figure is realized by comparing the dimension of the concatenated element with a predetermined threshold value and changing the values of pixels, which do not satisfy the predetermined conditions of figures, to "0."

If the above operation is performed, a result such as drawing Z shown in FIG. 3 is obtained. The drawing Z represents a drawing obtained by deleting the image x of the background drawing X from the image y of the to-be-processed drawing Y, that is, a drawing including only figure information such as an arrangement plan on the background drawing X. when a figure element of the drawing Z so processed is extracted as segment data, the arrangement plan can be processed efficiently and detected with high precision since undesirable and unnecessary figure information is eliminated in advance.

In the above processing, information of the background drawing is eliminated from the to-be-processed drawing by directly processing input image data. However, the segments of the drawings are converted into vector data as preprocessing of the input image data, and the figure element of the background drawing may be separated and deleted from the to-be-processed drawing using the vector data.

When using a vector data, the background drawing and to-be-processed drawing are read out by the scanner 2 and are stored in the image memory 3 as binary image data. Though the registration of the images of these drawings can be performed at the image data level described above, the segments of the image data of the drawings are converted into vector data, and the registration of the images of the drawings is performed at a level of the vector data. Using the vector data as described above, the registration can be performed by simply affine-transforming the vector data instead of affine-transforming all the image data, and it can be performed at high speed.

The figures on the images of the drawings can be expressed as vectors by bending line approximation after the line figures of the drawings are subjected to thin-line processing, or they can be expressed as vectors by bending line approximation outline information of the figures. Furthermore, the figures can also be expressed as vectors by vectorially expressing the center lines of the figures obtained from the vectors of the outlines.

Next, the vector of the background drawing and that of the to-be-processed drawing are made correspondent with each other through the steps shown in FIG. 4. More specifically, the vector processing operations are performed as follows. First the vectors are managed as database by the block method or BD-tree as described in Masao Sakauchi, "Image Database," Shokodo, 1987, to retrieve the vectors acquired from the each drawing at high speed (step A). It is thus possible to retrieve an arbitrary vector at high speed based on the database management.

Next, the vectors obtained from the background drawing X are then extracted in sequence and defined as original vectors, thereby forming a circumscribed rectangle surrounding the original vectors (step B). All the vectors in the to-be-processed drawing, which are involved with the circumscribed rectangle, are extracted and defined as candidate vectors (step C). The number of candidate vectors may be one, but it is generally two or more.

Figure 5:
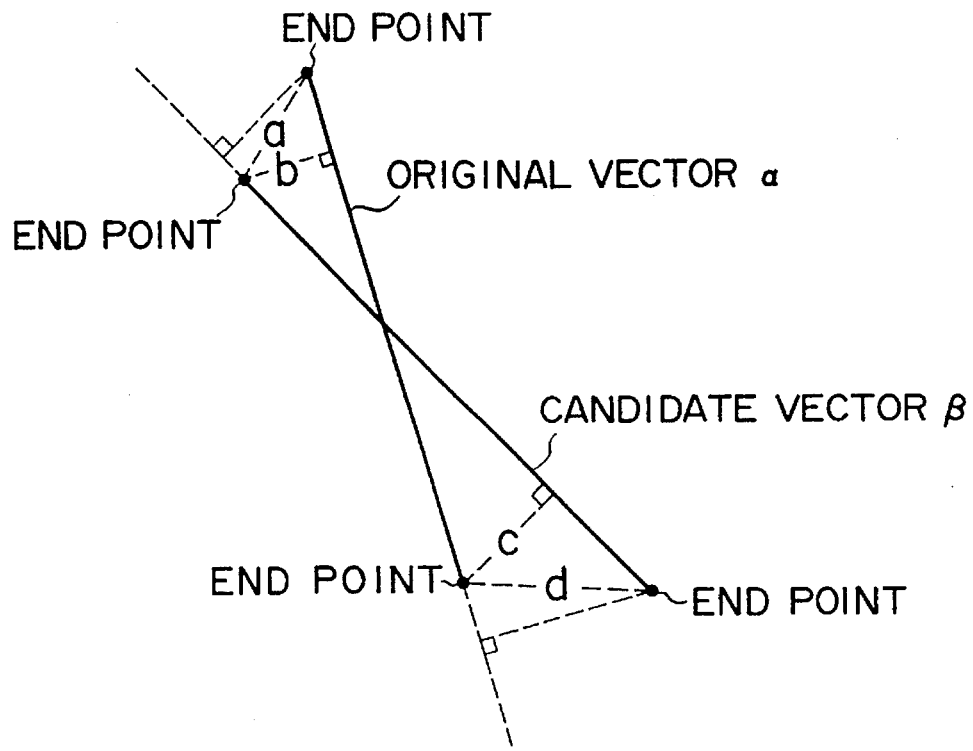
FIG. 5 is a view for explaining a degree of overlap between the vectors.

From then on, a degree of overlap between the candidate vectors and original vectors is calculated, for example, as the sum of the minimum two of perpendiculars a, b, c and d which are drawn between end points γ of original vector α and candidate vector β, as shown in FIG. 5 (step D). If a perpendicular does not lead from an end point of a first vector to a second vector, the distance between the end point of the first vector and that of the second vector is regarded as the length of the perpendicular.

When the degree of overlap so obtained is lower than a threshold value, it is determined that the vectors α and β can be made correspondent with each other. The candidate vector β corresponding to the original vector α is then classified as a vector of the figure in the background drawing.

Figure 6A:
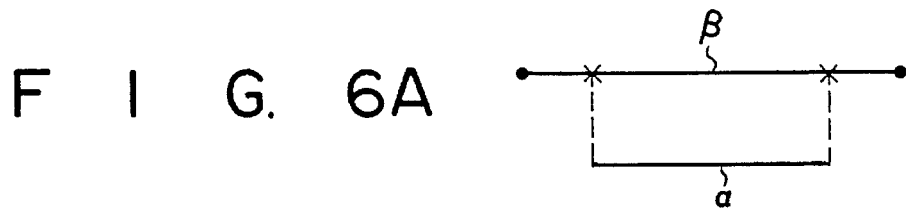
FIGS. 6A to 6C are views for explaining selection processing of candidate vectors.
Figure 6B:
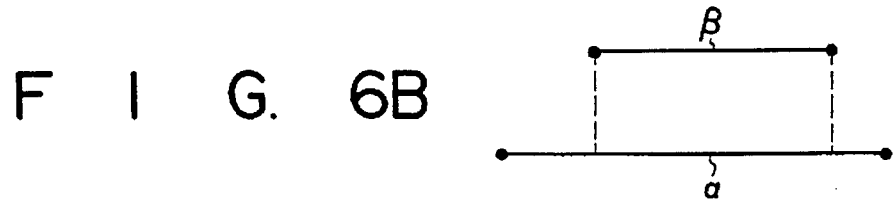
Figure 6C:
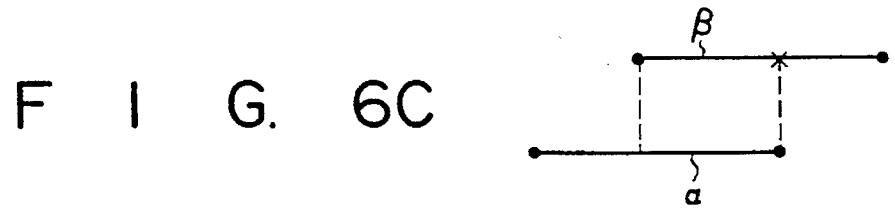

The correspondence between the vectors has three patterns as shown in FIGS. 6A to 6C.

In the first pattern shown in FIG. 6A, the original vector α obtained from the background drawing is included in the candidate vector β obtained from the to-be-processed drawing corresponding to the original vector α. Perpendiculars lead from the end points of the original vector α to the corresponding candidate vector β, and the candidate vector β is divided into three vectors at points where the perpendiculars reach the vector β. An attribute representing the vector in the background drawing is applied to the intermediate one of the three vectors, and then the above database is updated.

In the second pattern shown in FIG. 6B, the original vector α obtained from the background drawing involves the candidate vector β obtained from the to-be-processed drawing corresponding to the original vector α. In the second pattern, an attribute representing that the vector corresponds to the vector α of the background drawing, is applied to the candidate vector β, and the database is then updated.

In the third pattern shown in FIG. 6C, unlike the first and second patterns, the vectors α and β do not involve each other and, in other words, these vectors overlap each other. In the third pattern, perpendiculars lead from the end points of the original vector α to the corresponding candidate vector β, and the candidate vector α is divided into two vectors at points where the perpendiculars reach the vector β. An attribute representing that the vector corresponds to the vector α of the background drawing is applied to one of the two vectors which overlaps the original vector α, and then the above database is updated.

As described above, the vectors obtained from the background drawing and to-be-processed drawing are made correspondent with each other. It is then checked whether all candidate vectors β related to the circumscribed rectangle surrounding the original vector α &A are subjected to the operation of step D (step E). It is also checked whether all original vectors α obtained from the background drawing are subjected to the operation of step D (step F) and, if necessary, the above operations are repeated. When the processings of all the vectors are finished, the operation of correspondence between the vectors is also finished.

In above correspondence proceeding, if a vector which does not correspond to the original vector α, namely, a vector inherent in the to-be-processed drawing is extracted from the vectors obtained from the background drawing, only the figure data such as an arrangement plan on the background drawing is extracted, as shown in FIG. 3, and can thus be recognized.

When the background drawing is already given as vector data, a figure element of the to-be-processed drawing can be expressed as vector data so as to have the same data structure as that of the background drawing, or the structure of the vector data of the to-be-processed drawing can be changed to make the vector data correspondent with each other and classify the vector data.

The present invention is not limited to the above embodiment. For example, various vector processing techniques, which have been conventionally proposed, can be applied to a method of expressing a figure as vector data and a method of making the vector correspondent with each other. The drawing processing of the above embodiment can be advanced after a portion which is apparently information of the background drawing is excluded from the to-be-processed drawing. Furthermore, various changes and modifications to the present invention can be made without departing from the scope and spirit of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A drawing processing apparatus for extracting desired figures from a drawing as numerical data, comprising:

drawing input means for inputting a background drawing and a to-be-processed drawing and dividing figures drawn on said background drawing and said to-be-processed drawing into a plurality of segments to convert each of the segments to vector data, said to-be-processed drawing including figures drawn on the same figures as said background drawing;

storing means for storing said vector data corresponding to said background drawing and said vector data corresponding to said to-be-processed drawing;

registration means for registering said background drawing and said to-be-processed drawing with each other using said vector data read out from said storing means;

candidate vector extracting means for setting a predetermined circumscribed rectangle for each of said vectors obtained from said background drawing and extracting said vector data obtained from said to-be-processed drawing included in said circumscribed rectangle;

calculating means for calculating a degree of overlap between said vector data and said candidate vector data and determining said candidate vector data as a corresponding vector extracted from said background drawing when the degree of overlap is equal to or lower than a predetermined threshold value; and classifying means for classifying vectors, which correspond to the vectors formed from the figure on said background drawing, from the vectors formed from the figure on said to-be-processed drawing.

2. The drawing processing apparatus according to claim 1, wherein said drawing input means includes means for dividing each of a plurality of linear figures on the drawings into a plurality of segments, and performing a bending line approximation for said plurality of segments, thereby expressing the linear figures as vectors.

3. The drawing processing apparatus according to claim 1, wherein said drawing input means includes means for setting outlines corresponding to the plurality of linear figures, and for performing a bending line approximation for segments of the outlines.

4. The drawing processing apparatus according to claim 1, wherein said extracting means includes means for determining Whether corresponding original and candidate vectors coincide and for making said original vectors and said candidate vectors correspondent to each other when a degree of overlap of said corresponding original vectors and candidate vectors is less than a predetermined threshold value.

5. The drawing processing apparatus according to claim 1, wherein said drawing input means includes means for dividing figures on said background drawing and said to-be-processed drawing into a plurality of segments, and for converting the segments into segment data of numerical values, thereby representing the segments as vectors.

6. The drawing processing apparatus according to claim 1, wherein said extracting means extracts vectors which correspond to the vectors formed from the figure on said background drawing from the vectors formed on the figure on said to-be-processed drawing such that if a background figure vector coincides with a corresponding vector of said to-be-processed drawing which represents arrangement plan information, said corresponding vector of said to-be-processed drawing is not extracted.

* * * * *